(12) United States Patent
Murrish et al.

(10) Patent No.: US 9,726,508 B2
(45) Date of Patent: Aug. 8, 2017

(54) MOTORCYCLE ORGANIC GATHERING FOR ROUTE SHARING

(71) Applicant: HONDA MOTOR CO., LTD., Tokyo (JP)

(72) Inventors: Robert Wesley Murrish, Santa Clara, CA (US); Dennis Patrick Clark, Menlo Park, CA (US); Rahul Khanna, Plantation, FL (US); Daniel Behrendt, Atherton, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/876,325

(22) Filed: Oct. 6, 2015

(65) Prior Publication Data

US 2017/0097240 A1   Apr. 6, 2017

(51) Int. Cl.
*G01C 21/34* (2006.01)
*G01C 21/36* (2006.01)

(52) U.S. Cl.
CPC ....... *G01C 21/3438* (2013.01); *G01C 21/365* (2013.01); *G01C 21/3629* (2013.01)

(58) Field of Classification Search
CPC .............. G01C 21/3629; G01C 21/365; G01C 21/3652
USPC ........................................................ 701/408
See application file for complete search history.

(56) References Cited

U.S. PATENT DOCUMENTS

| | | | |
|---|---|---|---|
| 8,364,389 B2 | 1/2013 | Dorogusker et al. | |
| 8,463,537 B2 | 6/2013 | Mueller et al. | |
| 8,606,506 B2 * | 12/2013 | Johnson ................ | G01C 21/28 340/988 |
| 8,725,410 B2 | 5/2014 | Ando et al. | |
| 8,774,851 B2 | 7/2014 | Mirbaha et al. | |
| 8,842,003 B2 | 9/2014 | Huston | |
| 8,862,055 B2 | 10/2014 | Mirbaha et al. | |
| 2007/0168118 A1 | 7/2007 | Lappe et al. | |
| 2008/0278314 A1 | 11/2008 | Miller et al. | |
| 2012/0078509 A1 | 3/2012 | Choi | |
| 2012/0202485 A1 | 8/2012 | Mirbaha et al. | |
| 2012/0239584 A1 * | 9/2012 | Yariv ................. | G01C 21/3438 705/319 |
| 2013/0214939 A1 | 8/2013 | Washlow et al. | |
| 2013/0305437 A1 * | 11/2013 | Weller ................ | A42B 3/0406 2/422 |
| 2014/0005941 A1 | 1/2014 | Paek et al. | |
| 2014/0214933 A1 | 7/2014 | Liu et al. | |
| 2015/0031322 A1 | 1/2015 | Twina et al. | |
| 2015/0185034 A1 * | 7/2015 | Abhyanker ............ | G01C 21/36 701/23 |
| 2016/0003637 A1 * | 1/2016 | Andersen ........... | G01C 21/3617 701/519 |

* cited by examiner

*Primary Examiner* — Yazan Soofi
(74) *Attorney, Agent, or Firm* — Arent Fox LLP (57) ABSTRACT

An organic gathering system for route sharing is provided. The system includes a profile manager that determines settings associated with a first user that desires to pair with one or more other users during travel. An observation manager determines a group of users in a defined geographic area for pairing with the first user during at least a portion of the travel. The system also includes a navigation manager that provides instructions to the first user related to the pairing. The instructions include an action to be performed by the first user to pair with one or more of the other users.

16 Claims, 9 Drawing Sheets

MOTORCYCLE ORGANIC GATHERING FOR ROUTE SHARING

BACKGROUND

Motorcycle riding has become popular and people from different backgrounds have become occasional riders or avid riders. This increase in riders has resulted in an increase in motorcycle accidents. Some of this increase may be due to drivers of other vehicles not seeing the motorcycle and its rider. Thus, to be more visible to others on the road, some motorcyclists try to pair up with their friends and ride in a group of two or more. However, it may be difficult to find friends to ride with and, therefore, the rider is not able to take advantage of the visibility provided by two or more riders.

BRIEF DESCRIPTION

This brief description is provided to introduce a selection of concepts in a simplified form as compared to that described below in the detailed description. This brief description is not intended to be an extensive overview of the claimed subject matter, identify key factors or essential features of the claimed subject matter, nor is it intended to be used to limit the scope of the claimed subject matter.

An implementation of this disclosure relates to an organic gathering system for route sharing. The system includes a profile manager determining settings associated with a first vehicle that is to be paired with at least a second vehicle during travel. The system also includes an observation manager determining a group of vehicles in a defined geographic area for pairing with the first vehicle during at least a portion of the travel. The group of vehicles includes at least the second vehicle. Further, the system includes a navigation manager providing instructions to the first vehicle related to the pairing. The instructions include an action to be performed by the first vehicle to pair with at least the second vehicle.

Another implementation of this disclosure relates to a method for pairing two or more users for travel together. The method includes determining, by a system comprising a processor, a group of users traveling within a geographic area of a first user. The method also includes evaluating, by the system, respective profile data of each user in the group of users based on profile data of the first user. Further, the method includes outputting, by the system, details related to a second user of the group of users as a result of the evaluating. The method also includes providing, by the system, instructions for pairing with the second user. The instructions include details related to waiting at a designated location until the second user arrives at the designated location.

A further implementation of this disclosure relates to an organic gathering system for pairing motorcycle riders. The system includes a profile manager determining preferences associated with a motorcycle rider based on a determination that the motorcycle rider is to be paired with another motorcycle rider. The system also includes an observation manager determining other motorcycle riders that are located within a defined area of the motorcycle rider. Further, the system includes a rate monitor ranking the other motorcycle riders based on a comparison between the preferences associated with the motorcycle rider and respective preferences associated with the other motorcycle riders. Also included in the system is an interface component receiving a selection of at least one motorcycle rider from the other motorcycle riders. The system also includes a navigation manager outputting instructions that allow the motorcycle rider to pair with at least the one motorcycle rider based on the motorcycle rider stopping at a determined location for at least the one motorcycle rider.

The following description and annexed drawings set forth certain illustrative aspects and implementations. These are indicative of but a few of the various ways in which one or more aspects may be employed. Other aspects, advantages, or novel features of the disclosure will become apparent from the following detailed description when considered in conjunction with the annexed drawings.

BRIEF DESCRIPTION OF THE DRAWINGS

Aspects of the disclosure are understood from the following detailed description when read with the accompanying drawings in which.

DETAILED DESCRIPTION

Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

Motorcycle riders may like to ride in groups, which may be based on the belief that there is safety in numbers. More riders may make the group more visible to others on the road. However, at times it may be difficult to find someone to ride with and, therefore, a rider may ride alone. The various aspects disclosed herein allow two or more riders (or operators of other vehicles) to pair with each other for at least a portion of a route. Other vehicles that may utilize the disclosed aspects include, but are not limited to, bicycles, various off-road vehicles, automobiles (e.g., driving highway 50 across Nevada), boats, drones, planes, spacecraft, and so on.

The invention relates to allowing motorcycle riders to group together for safety or for other purposes. For example, in many situations motorcycle riders like to ride in groups or packs since there is safety in numbers. Further, with more riders together, the riders are more visible to others (e.g., automobile drivers) than the riders would be riding alone or in groups of two or three.

The aspects disclosed herein allow riders to group together through applications and/or connections while still allowing each rider to be flexible and leave the group whenever the rider would like to leave. A helmet (or other wearable device) allows the motorcycle riders to be paired and connect with each other. In one example, a motorcycle rider is notified that she should stop at a yellow light and wait for another motorcycle rider that is approaching the light.

A helmet, such as the helmet disclosed in Skully (U.S. Patent App. Pub. No. 2013/0305437), which is incorporated herein in its entirety, may be utilized to allow the riders to communicate with each other. The helmets may connect with a server, which allows motorcycle riders to obtain the location of the other riders. In an example, a central server may be used to connect the motorcyclists together. Alternatively, short range communications may be utilized. Further, communications may be interacted with one another.

Diagrams (e.g., maps) may be placed on (or within view) of the helmet to allow a rider to determine where one or more other riders are located. For example, a rider may slow down to allow time for one or more other motorcycle riders to catch up so that they may ride together as a group. According to some implementations, slowing down (speeding up, or taking another action) is relevant to more than a map/diagram view. For example, the rider may receive specific instructions (e.g., reduce speed) as text, audio, or through other user interface types (e.g., haptic feedback).

The disclosed aspects may group together motorcyclist riders with similar riding habits, skill level, bike style, and so on. For example, riders that tend to ride slowly (e.g., the speed limit or slower) may be paired with other riders that typically ride slowly. In another example, riders that like to take sightseeing routes and stop at local restaurants may be paired together, as opposed to being paired with riders that have a particular destination in mind and do not like to travel too far off the beaten path.

Figure 1:
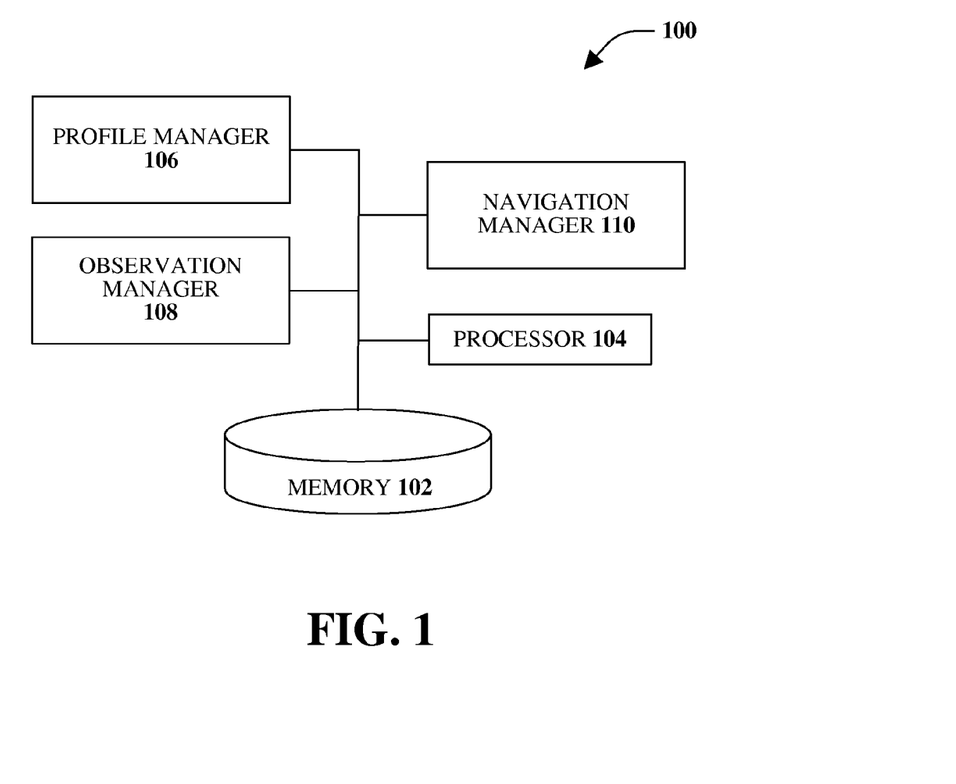
FIG. 1 illustrates an example non-limiting organic gathering system that may be utilized with various modes of transportation according to an aspect of this disclosure.

FIG. 1 illustrates an example non-limiting organic gathering system 100 that may be utilized with various modes of transportation according to an aspect of this disclosure. The organic gathering system 100 allows a motorcycle rider, for example, to determine if there are other riders in the area. If there are other riders, the organic gathering system 100 allows the rider to selectively connect with one or more of those other riders. For example, the riders may connect in order to travel together as a group.

Although the various aspects are discussed with respect to a motorcycle and a motorcycle rider, the aspects are not limited to this implementation. Instead, the aspects may be utilized by drivers and/or passengers of other modes of transportation including, but not limited to, vehicles (e.g., automobile, truck), bicycles, skateboards, pedestrians, joggers, drones, air vehicles, watercraft, and so on. In an example, the disclosed aspects may be utilized when the vehicle does not have a rider/user (e.g., a drone). For example, two or more drones may be delivering medical prescriptions to the same house, different houses on the same street, different houses in the same city, and so on. In this case, the drones may be paired to facilitate at least a portion of the trip (or route) being shared by the two or more drones.

In another example, two or more drones may benefit from the disclosed aspects even if one or more of the drones are controlled by different operators (e.g., not by the same controller). In some implementations, one or more of the drones may be an autonomous drone or a semi-autonomous drone. For example, a first shipping/delivery service may operate a first drone and a second shipping/delivery service may operate two other drones (e.g., a second drone and a third drone). Thus, at least portions of a route of the first drone may be combined with portions of the routes of the second drone and/or the third drone. This may provide safety in numbers, consolidation of noise, consolidation of air traffic space, and so on. Further, this pairing may be performed in the absence of a physical driver controlling the vehicle (e.g., the drone).

The organic gathering system 100 may include at least one memory 102 that may store computer executable components and/or computer executable instructions. The organic gathering system 100 may also include at least one processor 104, communicatively coupled to the at least one memory 102. The at least one processor 104 may facilitate execution of the computer executable components and/or the computer executable instructions stored in the memory 102. The term "coupled" or variants thereof may include various communications including, but not limited to, direct communications, indirect communications, wired communications, and/or wireless communications.

It is noted that although the one or more computer executable components and/or computer executable instructions may be illustrated and described herein as components and/or as instructions separate from the memory 102 (e.g., operatively connected to the memory 102), the various aspects are not limited to this implementation. Instead, in accordance with various implementations, the one or more computer executable components and/or the one or more computer executable instructions may be stored in (or integrated within) the memory 102. Further, while various components and/or instructions have been illustrated as separate components and/or as separate instructions, in some implementations, multiple components and/or multiple instructions may be implemented as a single component or as a single instruction. Further, a single component and/or a single instruction may be implemented as multiple components and/or as multiple instructions without departing from the example embodiments.

The organic gathering system 100 may include a profile manager 106 that determines settings associated with a first user (e.g., the motorcycle rider). The settings may be determined based on input received from the first user and/or based on observed information. According to an implementation, the profile manager 106 may receive data manually input by the first user, which may include preferences and other information. According to another implementation, the profile manager 106 may obtain the information based on historical information and/or current information related to the first user.

The system 100 may also include an observation manager 108 that determines a group of users (e.g., other motorcycle riders) in a defined geographic area. For example, the defined geographic area may be a configurable range or radius around the first user. According to some implementations, the defined area may be complex. For example, riders within a radius, and heading to destinations that are located within a radius of one another may constitute a group of users. In another example, riders moving in a same direction may constitute a group of users. Further, the group of users may be determined based on other similarities between the users.

Each user in the group of users may be those users that have opted into the system (e.g., agreed to participate in route sharing with other users). It is noted that in accordance with one or more implementations described in this disclosure, users may opt-out of providing personal information, demographic information, location information, proprietary information, sensitive information, or the like in connection with data gathering aspects. Moreover, one or more implementations described herein may provide for anonymizing collected, received, and/or transmitted data. Further, a user may opt-out of providing information at any time, regardless of whether the user previously opted-in to providing the information.

A navigation manager 110 may provide instructions to the first user related to the pairing. The navigation manager 110 may output the instructions in an audio format, a visual format, a haptic format, or combinations thereof. Thus, the navigation manager 110 may provide dynamic notifications related to other riders in the area and instructions on how to pair up with the other riders. For example, the navigation manager 110 may notify the first user that there is another user up ahead and if the first user travels just a little faster, she will catch up with the other user. In another example, the navigation manager 110 may inform the first user to slow down or to stop at the next light (e.g., do not go through a yellow light) to allow another user to catch up to the first user. In a further example, the first user may be instructed to wait in a nearby parking lot for the other user. Additionally, the navigation manager 110 may instruct the first user to take a short detour in order to pair with the other driver.

Further, the one or more other users (e.g., other motorcycle riders) with which the first user is being paired may be given information about the first user. For example, the other users may be notified that the first user is waiting at the red light up ahead or that the first user has slowed down (and the others should speed up) to pair with each other.

It should be noted that regardless of the action of the first rider, the second rider may be provided separate instructions. For example, a system associated with the second rider may act as if the second rider (discussed herein) is the first rider, and as if the first rider (discussed herein) is the second rider, without necessitating any change to the actions of the system 100 of the first rider. In a similar manner, each rider and their respective system may consider herself to be the "first rider" and the respective system (as well as the system 100) will still function appropriately.

According to some implementations, the navigation manager 110 may output a map that illustrates the relationship between the first user and the other users in the group of users. The relationship may include similarities between the first user and the other users (e.g., driving habits, driving behavior, intended route, and so on). Additionally or alternatively, the relationship may include group affiliation and/or filtering based on group affiliation before it reaches the point of being shown on a map. Further, the map may illustrate the current location of each of the riders to facilitate pairing.

In an implementation, after two or more riders are paired, the system may continue to attempt to pair those two or more riders with other riders. Thus, three or more riders may be paired at different times. For example, a first and second rider are paired and later those two riders are paired with a third rider. A few minutes later, a fourth rider is paired with the first three riders. Thereafter, the first rider turns off the road, away from the other three riders. This leaves the second rider, third rider, and fourth rider as a group. Other riders may join and/or one of the riders may leave the group. In such a manner, attempts are made to keep two or more riders together in a dynamic group. Alternatively or additionally, the group might be split. For example, a group of riders might separate with the first and second riders turning north and the third and fourth riders turning south.

Figure 2:
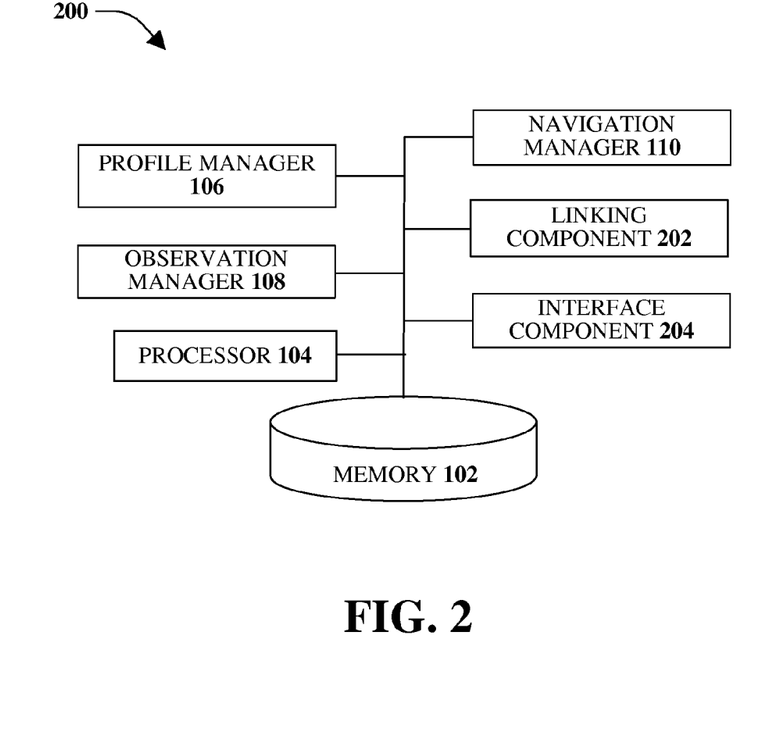
FIG. 2 illustrates an example non-limiting organic gathering system for route sharing according to an aspect of this disclosure.

FIG. 2 illustrates an example non-limiting organic gathering system 200 for route sharing according to an aspect of this disclosure. As discussed herein, the various aspects allow users (e.g., riders, drivers, or others) to group through wireless communication network applications and/or connections while still allowing a first user (or subsequent users) to be flexible and leave the group as desired.

According to various implementations, a helmet may be utilized to communicate the pairing information to the first user and/or to allow the first user to communicate with other users (e.g., other riders). In one example, a motorcycle rider may be notified that they should stop at a yellow light so they may wait for an upcoming motorcycle rider.

As a specific example a helmet, such as the augmented reality motorcycle helmet described in U.S. Patent Application Publication No. 2013/0305437, which is incorporated herein in its entirety, may be utilized with the disclosed aspects. However, other types of motorcycle helmets may be utilized and the disclosed aspects are not limited to a single implementation of a motorcycle helmet. It is noted that although various aspects are discussed with respect to a helmet, other items may be utilized instead of a helmet. For example, the various aspects may be utilized with a mobile device, a display built into the motorcycle (or other vehicle), an audio device, and so on. In addition, for vehicles that do not have a rider/driver, the instructions (which may take the form of notifications) may be provided at a location located remote from the vehicle (e.g., at a device associated with a controller of the vehicle).

The helmets may connect with a server such that motorcycle riders are provided information as to where other motorcycle riders are located. Further, communications between motorcycle riders may be facilitated through interaction with the helmet and the server, or over a communications network (e.g., short-range communications network, a long-range communications network, a mobile network, and so on). Further, diagrams or a map may be placed on the helmet (e.g., on a shield or heads up display) such that the rider is provided information as to where the other riders are located. For example, a rider may slow down to let other motorcycles catch up with her.

A linking component 202 may pair the first user (e.g., motorcycle rider) with a second user (e.g., another motorcycle rider) based on respective riding habits (or habits associated with another mode of transportation). In an example, slower riders may be paired with other slower riders, but would not be paired with a rider that tends to ride at an excessive speed. For example, the profile manager 106 (or subsequent profile managers associated with other users) may gather information and determine settings associated with the first user. The settings may include information such as a safety rating of the first user, whether the first user habitually speeds or maintains the speed limit, and so on. According to an implementation, the profile manager 106 also gathers information related to the other users and maintains the settings for those other users (e.g., at a centralized server). However, according to some implementations, the settings are maintained by different profile managers associated with devices of each respective user and information communicated as necessary to pair two or more users.

Although discussed with respect to riding habits, other parameters may be utilized additionally or alternatively. For example, a parameter may be a skill level, such as beginning, advanced, experienced, and so on. In another example, a parameter may be a bike style. Such styles may include sport, cruiser, touring, and so on. In yet another example, a parameter may be a displacement. For example, the displacement may be 250 cc, 1000 cc, and so on, or an equivalent for electric or other drive bikes.

Further, according to some implementations, the pairing may include not just the actual style of the rider, but also their desired style. For example, a safety rating may be determined for a rider. In this case, a rider with a low rating (or another designation that identifies a poor safety rating) may nonetheless desire to ride with riders that have a high safety rating. In this way, the poorly rated rider may learn better safety habits and practices from the highly rated riders.

In some implementations, the highly safe rated rider(s) might be provided the opportunity to choose whether to accept the lower safety ranked riders that want to learn, or to only ride with other safe riders. Based on a saved preference file (e.g., user preferences), a learned preference, or a choice at the time of the decision, the linking may be denied or approved. Thus, the system might be utilized to pair experienced or more skilled riders with less experienced or less skilled riders.

As an example, the profile manager 106 may obtain information about the first user and map that information to predefined settings (e.g., preferences, likes, dislikes, driving behavior, and so on). The predefined settings may have different subsets that provide granularity related to the particular setting. For example, a setting related to speed may include a subset for "drives at or below speed limit," "drives within 10 miles above speed limit," "speeds over ten miles above speed limit," and other subsets. Thus, as information is observed (or manually input by the user), each user may be placed into the appropriate subset.

The settings and/or subsets may dynamically change as the user's behaviors or habits change. For example, the user may habitually speed and, therefore, this habit places the user in the speed category. Then the user's wife has a baby and the user decides to no longer be reckless and, therefore, drives within 10 miles of the speed limit. Based on this change, the user is moved from the speed category to the 10 miles category. The other users are categorized in a similar manner and, based on these categorizations, the linking component 202 makes a determination as to which users would be a good match for each other.

According to some implementations, the system 200 may include an interface component 204 that allows the first user to interact with the system 200. For example, the first user may indicate that she would like to be paired with other users, even if the riding behavior settings do not match. Thus, for at least a portion of the trip, the first user may be paired with another user that tends to ride faster (or slower) than the first user normally rides.

A willingness to be paired with riders who are open to whom they ride with may also be utilized as a preference. For example, a first rider may be willing to ride with a faster second rider. In this case, there might be some assumption that the first rider will conform to the preferences of the second rider by riding faster. This is distinct from both riders being willing to change from their usual system, meet in the middle, or otherwise mutually adapt their behavior to each other, which might be the case according to some implementations.

Further, the first user may interact with the interface component 204 to provide a listing of other users that she does not want to be paired with. This information may be provided at any time. For example, the first user may be paired with someone and, for various reasons the pairing does not work. Therefore, the first user may indicate that she does not want to be paired with that person in the future. In some cases, the request not to be paired with someone may be made in advance (e.g., based on a prior relationship between the users). In this case, even if the users would benefit from being paired, the linking component 202 ignores the information related to the other user being around and a candidate for pairing. In some implementations, a map or other indication may include the other user, but that user may be distinguished from the other users (e.g., a warning provided, an icon of the user is indicated but a red "X" is placed over the icon of the user on the map). In this manner, the presence of the other user is known, but information or instructions related to linking with that user is not provided.

The indication not to pair with another rider may be one sided such that only one of the riders needs to identify the other rider with a request not to be paired. In some implementations, information about the riders are not provided to each other (e.g., the map does not include the location of the respective riders).

In a similar manner, the first user may use the interface component 204 to provide an indication of others she would like to be paired with and these others may be priority riders. For example, there is another user that the first user may be paired with that is very close (e.g., within two minutes). There is also a designated rider (e.g., a priority rider) that is a further away (e.g., within five minutes). The system 200 may ignore the close rider and let the first user know that the priority rider is five minutes away and provide the option to pair with the priority rider. In some cases, the system 200 may notify the first user of both riders, with an indication that one of the riders is the priority rider. Thus, the interface component 204 may output the map or other indication that distinguishes priority riders from other riders. Further, the first user may indicate the priority riders at any time, or may change a rider status at any time.

Further, according to some implementations, another user might not desire to be paired with the first user, or might consider the first user a priority rider. Thus, the preferences of the other user may be utilized to determine the linking.

According to some implementations, the interface component 204 (as well as other interface components discussed herein) may provide a graphical user interface (GUI), a command line interface, a speech interface, Natural Language text interface, and the like. For example, a GUI may be rendered that provides a user with a region or means to load, import, select, read, and so forth, various requests and may include a region to present the results of the various requests. These regions may include known text and/or graphic regions that include dialogue boxes, static controls, drop-down-menus, list boxes, pop-up menus, as edit controls, combo boxes, radio buttons, check boxes, push buttons, graphic boxes, and so on. In addition, utilities to facilitate the information conveyance, such as vertical and/or horizontal scroll bars for navigation and toolbar buttons to determine whether a region will be viewable, may be employed. Thus, it might be inferred that the user did want the action performed.

The user may also interact with the regions to select and provide information through various devices such as a mouse, a roller ball, a keypad, a keyboard, a pen, gestures captured with a camera, a touch screen, and/or voice activation, for example. According to an aspect, a mechanism, such as a push button or the enter key on the keyboard, may be employed subsequent to entering the information in order to initiate information conveyance. However, it is to be appreciated that the disclosed aspects are not so limited. For example, merely highlighting a check box may initiate information conveyance. In another example, a command line interface may be employed. For example, the command line interface may prompt the user for information by providing a text message, producing an audio tone, or the like. The user may then provide suitable information, such as alphanumeric input corresponding to an option provided in the interface prompt or an answer to a question posed in the prompt. It is to be appreciated that the command line interface may be employed in connection with a GUI and/or API. In addition, the command line interface may be employed in connection with hardware (e.g., video cards) and/or displays (e.g., black and white, and EGA) with limited graphic support, and/or low bandwidth communication channels. This may also be performed at the time of the ride (from the motorcycle), or offline (e.g., at a computer hours before the ride).

Figure 3:
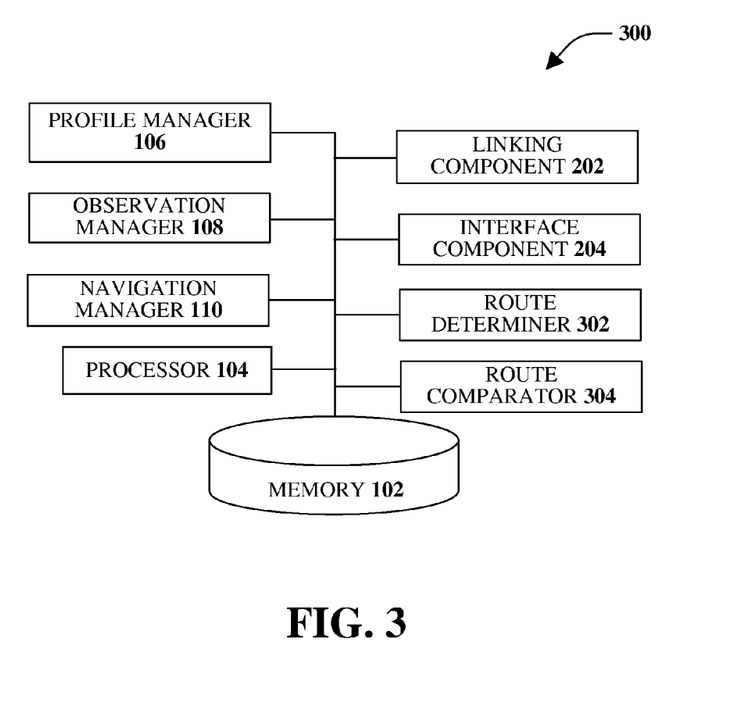
FIG. 3 illustrates an example non-limiting system for pairing riders for at least a portion of a route according to an aspect of this disclosure.

FIG. 3 illustrates an example non-limiting system 300 for pairing riders for at least a portion of a route according to an aspect of this disclosure. Various riders may be paired for any length of time during a trip. For example, a trip may include various route segments. The route segments may be defined based on various criteria including city blocks, highway mile markers, miles to be driven, and so on. Further, even though riders are paired, any of the riders may leave the grouping as desired.

Included in the system 300 may be a route determiner 302 that evaluates planned routes and/or inferred routes of each user of the group of users. According to an implementation, each user may interface with respective interface components to input a planned route (e.g., traveling from one state to another state and using designed highways). For example, one or more riders may enter or communicate other intermediate nodes in a route (e.g., restroom breaks, meal breaks, sightseeing breaks, and so on). Each rider may individually choose to join the break together, or continue separately (and perhaps meeting again later).

In an additional or alternative implementation, routes of the respective users may be determined based on observations and/or historical information (e.g., on weekdays the rider travels from her home to work, which is 40 miles away on Interstate 71). Accordingly, it may be inferred that since it is Thursday, she is traveling to work via Interstate 71.

Based on the planned and/or inferred route information, segments of the route may be ascertained by the route determiner 302. Thus, users that are sharing at least some route segments may be linked while traveling along those route segments.

The system 300 may also include a route comparator 304 that compares a route of the first user with respective routes of users in the group of users. The route comparator 304 also utilizes information related to the timing of when each user of the group of users travels (or will be traveling) along a particular route segment. For example, a first user is traveling along a route segment, and a second user is just up ahead and both users have indicated they would like to pair with others. Then, the first user may be instructed to speed up slightly, and the second user is instructed to slow down slightly in order for the users to join together.

According to some implementations, at least some of the route segments may be output to the user in a perceivable format, such as on a map display. The route segment and/or other information (e.g., instructions, identification of other riders, and so on) may be output on a head-up display viewable by the first user. If the user is a motorcycle rider that is wearing a helmet, the route segment and/or other information may be output on the motorcycle helmet (e.g., on a helmet shield or another potion of the helmet) that includes the heads up display. In another example, the information may be output on a windshield. According to another example, the information may be output on a mobile device (e.g., a user phone, a watch, and so on).

Figure 4:
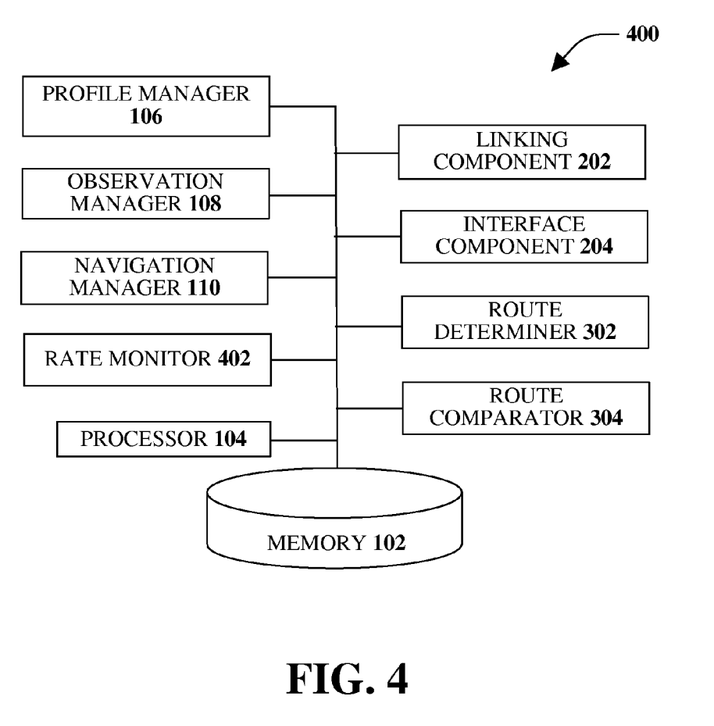
FIG. 4 illustrates an example non-limiting system that provides a ranking of nearby riders for rider pairing according to an aspect of this disclosure.

FIG. 4 illustrates an example non-limiting system 400 that provides a ranking of nearby riders for rider pairing according to an aspect of this disclosure. In some instances, there may be multiple riders in a particular geographic area with which the first rider may connect. In some instances, two or more of the riders may be suitable for the first rider. Therefore, a rate monitor 402 may provide the first rider respective rankings for the riders in the group of riders.

For example, the rate monitor 402 may determine how closely a profile of the first rider matches each profile of the other riders in the geographic area. In an implementation, each parameter or setting within the respective profiles may be compared and an aggregate of the settings utilized to determine the ranking.

According to some implementations, the ranking may be based on predefined criteria and/or rider preferences. For example, it may be more important for the first rider to pair with another rider such that the will be traveling a long distance together, regardless of whether the other rider speeds or travels close to the speed limit. In another example, it may be more important for the first rider to pair with someone that is planning to stop at a restaurant in a few hours (and is traveling along a same route) rather than someone that plans to ride the route straight through.

Information related to a planned route, expected stops, and so on may be manually input by each rider on their respective interfaces. In another example, information related to the route and expected stops may be inferred based on observed information, historical information, or other considerations.

According to some implementations, the riders are provided information that details why the riders are being paired. In such a manner, each rider may make a decision as to whether to accept the suggestion to pair with the other rider. The rider may affirmatively accept the suggestion based on a prompt (e.g., "Do you want to pair with Rider Y?") The rider may verbally approve (or disapprove) the suggestion or convey the decision in another manner (e.g., manual input, shaking head, and so on).

Figure 5:
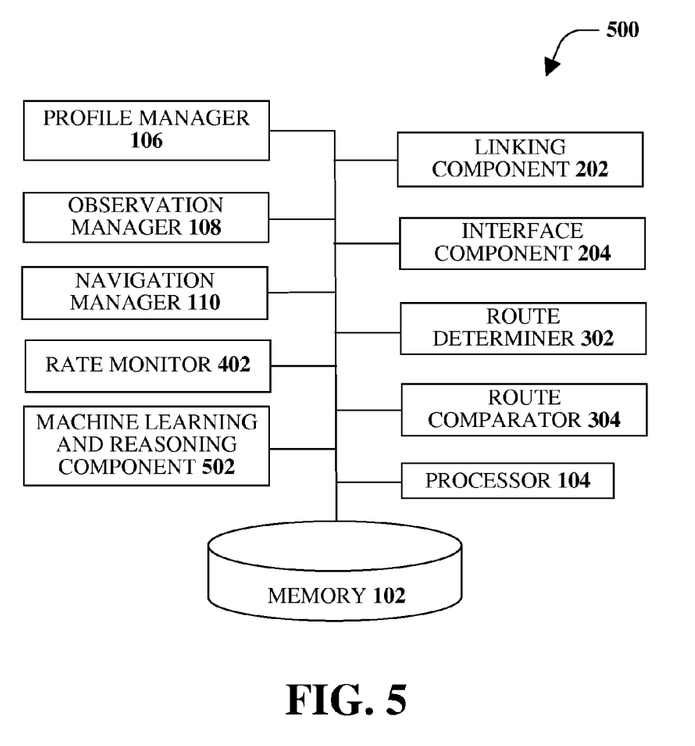
FIG. 5 illustrates an example non-limiting system that utilizes automated learning according to an aspect of this disclosure.

FIG. 5 illustrates an example non-limiting system 500 that utilizes automated learning according to an aspect of this disclosure. For example, a machine learning and reasoning component 502 may be utilized to automate pairing riders of motorcycles or users of other modes of transportation. The machine learning and reasoning component 502 may employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component 502 may employ principles of probabilistic and decision theoretic inference. Additionally or alternatively, the machine learning and reasoning component 502 may rely on predictive models constructed using machine learning and/or automated learning procedures. Logic-centric inference may also be employed separately or in conjunction with probabilistic methods.

The machine learning and reasoning component 502 may infer whether a rider is suitable to be paired with another rider, whether riders are taking a similar route, whether riders have similar patterns and behaviors, and so on. In some implementations, riders may provide feedback after the ride based on a prompt (e.g., did you enjoy riding with that person? Y/N.") Answers to these questions might be input into the learning or logic elements of the decision to pair. It might also be used to build up a social graph of riders who are compatible, provided the respective riders cluster into separable groups.

In another example, the machine learning and reasoning component 502 may infer that a rider has certain driving behaviors and compare those behaviors with the driving behaviors of other riders. Such inferences may be made by obtaining knowledge about the road conditions, the weather conditions, information about the driver of the vehicle, vehicle information including maintenance information, and so on. Based on this knowledge, the machine learning and reasoning component 502 may make an inference based on which actions to implement, whether two or more riders should be paired, the location where the pairing should take place, and so on.

As used herein, the term "inference" refers generally to the process of reasoning about or inferring states of the system, a vehicle, a motorcycle, a component, a module, the environment, and/or one or more sets of content from a set of observations as captured through events, reports, data, and/or through other forms of communication. Inference may be employed to identify a specific context or action, or may generate a probability distribution over states, for example. The inference may be probabilistic. For example, computation of a probability distribution over states of interest based on a consideration of data and/or events. The inference may also refer to techniques employed for composing higher-level events from a set of events and/or data. Such inference results in the construction of new events and/or actions from a set of observed events and/or stored event data, whether or not the events are correlated in close temporal proximity, and whether the events and/or data came from one or several events and/or data sources. Various classification schemes and/or systems (e.g., support vector machines, neural networks, logic-centric production systems, Bayesian belief networks, fuzzy logic, data fusion engines, and so on) may be employed in connection with performing automatic and/or inferred action in connection with the disclosed aspects.

The various aspects (e.g., in connection with observing riders and pairing groups of two or more riders, and so on) may employ various artificial intelligence-based schemes for carrying out various aspects thereof. For example, a process for determining if certain riders should be paired, determining how to pair riders, providing instructions for the pairing, determining for which portions of a route two or more riders may be paired, and so on, may be enabled through an automatic classifier system and process.

A classifier is a function that maps an input attribute vector, $x=(x1, x2, x3, x4, xn)$, to a confidence that the input belongs to a class. In other words, $f(x)=confidence(class)$. Such classification may employ a probabilistic and/or statistical-based analysis (e.g., factoring into the analysis utilities and costs) to prognose or infer an action that should be employed related to route pairing as discussed herein. In the case of pairing, for example, attributes may be identification of the riders attempting to be paired and the classes may be information (e.g., behaviors, route to be traveled) related to the riders.

A support vector machine (SVM) is an example of a classifier that may be employed. The SVM operates by finding a hypersurface in the space of possible inputs, which hypersurface attempts to split the triggering criteria from the non-triggering events. Intuitively, this makes the classification correct for testing data that may be similar, but not necessarily identical to training data. Other directed and undirected model classification approaches (e.g., naïve Bayes, Bayesian networks, decision trees, neural networks, fuzzy logic models, and probabilistic classification models) providing different patterns of independence may be employed. Classification as used herein may be inclusive of statistical regression that is utilized to develop models of priority.

One or more aspects may employ classifiers that are explicitly trained (e.g., through a generic training data) as well as classifiers that are implicitly trained (e.g., by observing changes or updates to driver behavior, by receiving extrinsic information (e.g., a road detour, location of an accident that is blocking traffic), and so on). For example, SVM's may be configured through a learning or training phase within a classifier constructor and feature selection module. Thus, a classifier(s) may be used to automatically learn and perform a number of functions, including but not limited to determining which riders to pair, determine when to pair riders, determining when riders should not be paired, and so forth. The criteria may include, but is not limited to, vehicle information, driver information, road conditions, weather conditions, and so forth.

Additionally or alternatively, an implementation scheme (e.g., a rule, a policy, and so on) may be applied to control and/or regulate the pairing of riders. In some implementations, based upon a predefined criterion, the rules-based implementation may automatically and/or dynamically pair riders, provide a pairing suggesting, automatically output instructions for the pairing, and so on. In response thereto, the rule-based implementation may automatically interpret and carry out functions associated with the pairing by employing a predefined and/or programmed rule(s) based upon any desired criteria.

Methods that may be implemented in accordance with the disclosed subject matter will be better appreciated with reference to the following flow charts. While, for purposes of simplicity of explanation, the methods are shown and described as a series of blocks, it is to be understood and appreciated that the disclosed aspects are not limited by the number or order of blocks, as some blocks may occur in different orders and/or at substantially the same time with other blocks from what is depicted and described herein. Moreover, not all illustrated blocks may be required to implement the disclosed methods. It is to be appreciated that the functionality associated with the blocks may be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods might alternatively be represented as a series of interrelated states or events, such as in a state diagram.

Figure 6:
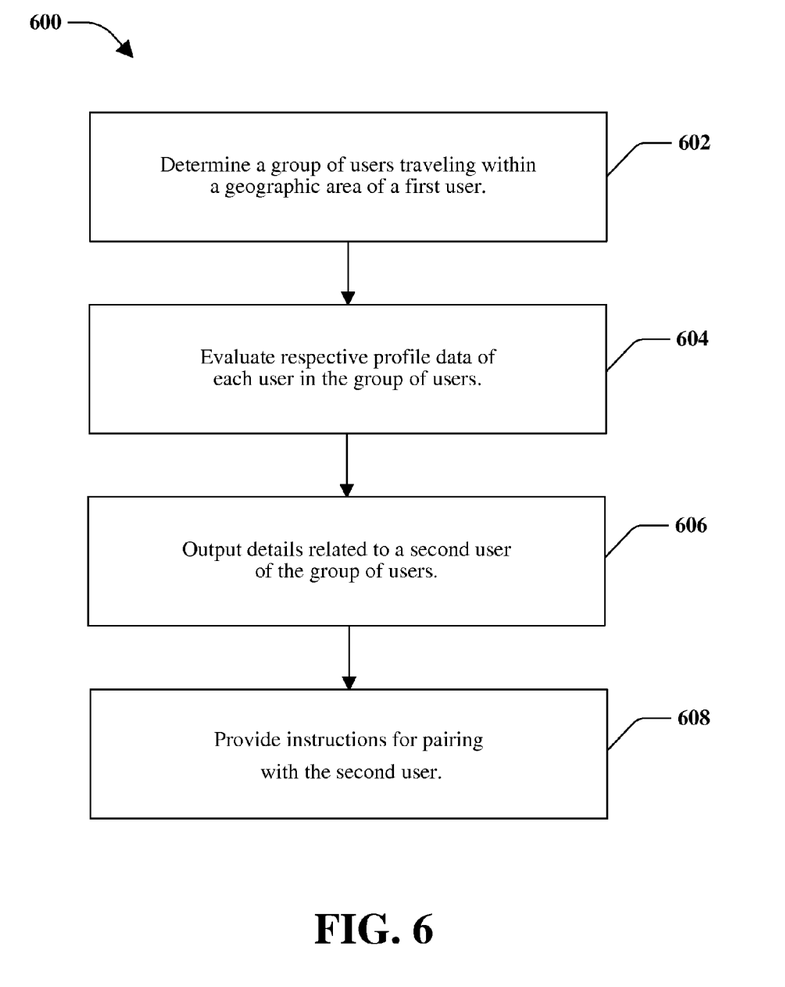
FIG. 6 illustrates an example non-limiting method for pairing riders according to an aspect of this disclosure.

FIG. 6 illustrates an example non-limiting method 600 for pairing riders according to an aspect of this disclosure. The method 600 may be implemented using any of the systems, such as the system 100 of FIG. 1, described herein.

The method 600 starts at 602 when a group of users traveling within a geographic area of a first user are determined. The group of users may include those users whose profile data match the first user. Further, the group of users may be those users that have indicated the desire to be paired with other riders.

At 604, respective profile data of each user in the group of users is evaluated based on profile data of the first user. For example, respective profile data of each user in the group of users may be compared to profile data of the first user. Thus, if the first user tends to drive the speed limit and a second user tends to speed excessively, the first user and second user might not be paired.

Details related to a second user are output, at 606. The second user is selected from the group of users as a result of the evaluation, at 604. The details may include an identification of the second user (e.g., your friend "Fred"), a location of the second user, settings or behaviors of the second user that match the first user, settings or behaviors of the second user that do not match the first user, a planned route of the second user, and so on.

Further, at 608, instructions for pairing with the second user are provided. According to an implementation, the instructions may include details related to the first user waiting at a designated location until the second user arrives at the designated location. The instructions may be provided in a mapping format to allow the users to locate each other. According to some implementations, the instructions may be output in an audible format. The details related to the second user (or other users) and/or the instructions may be output on a heads-up display, a helmet, a windshield, a user device, and so on.

Figure 7:
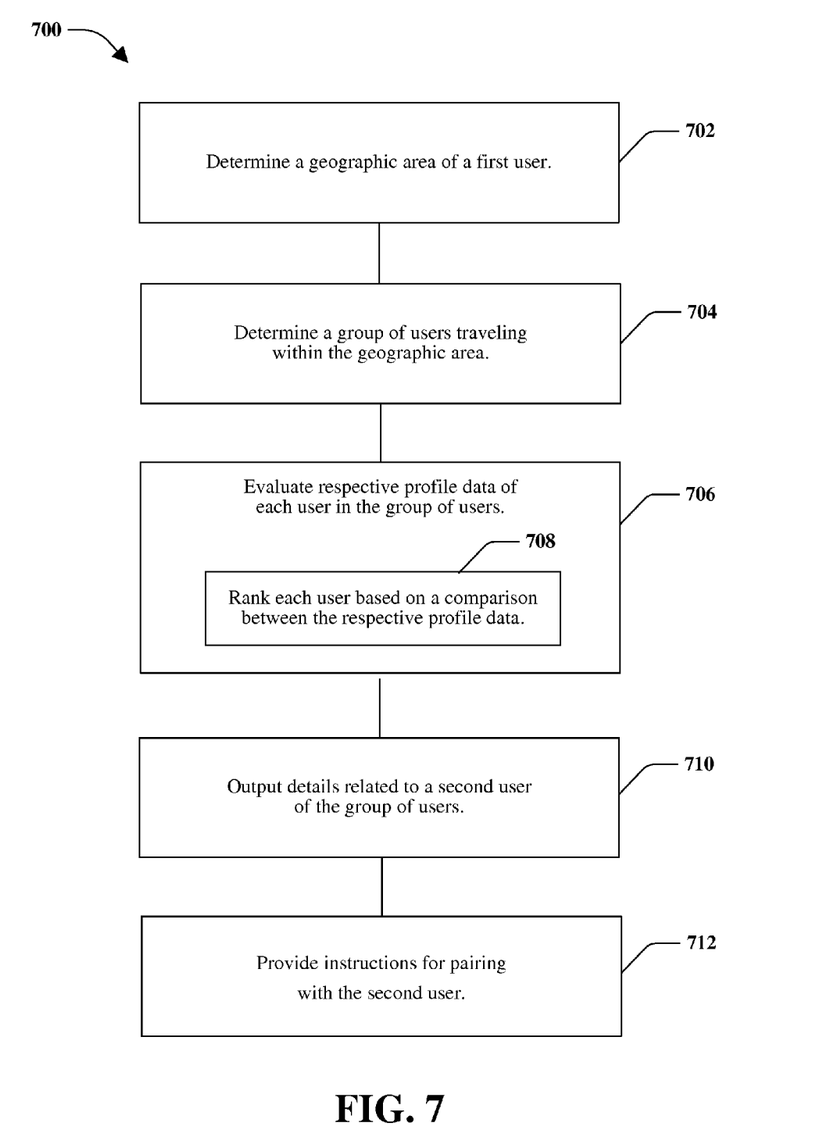
FIG. 7 illustrates an example non-limiting method for providing information to a driver to allow the driver to form a group with other drivers according to an aspect of this disclosure.

FIG. 7 illustrates an example non-limiting method 700 for providing information to a driver to allow the driver to form a group with other drivers according to an aspect of this disclosure. The method 700 may be implemented using any of the systems, such as the system 300 of FIG. 3, described herein.

At 702, a geographic area of a first user is determined. The geographic area may be a radius having a certain distance around the first user. In another example, the geographic area may be a certain length of a highway (e.g., 10 miles behind the first user and 10 miles ahead of the first user along a single road). In another example, the geographic area may be a generally circular area, a generally square area, a generally linear area, or areas having different shapes, contours, and lines.

At 704, a group of users traveling within the geographic area is determined. For example, the group of users may be evaluated for a common mode of transportation (e.g., motorcycle, vehicle, bicycle, pedestrian, and so on). The group of users may include all the users that have previously opted into a grouping application or may only include a subset thereof.

Respective profile data of each user in the group of users is evaluated, at 706. The evaluation may include ranking each user based on a comparison between the respective profile data, at 708. The comparison may include how many of the settings or parameters in the respective profiles match or are substantially the same. In another example, the comparison may be based on driver preferences, wherein one or more settings or parameters are ranked higher (or weighted differently) than other parameters.

At 710, details relate to a second user of the group of users is output to the first user. The details may indicate an identification of the second user, a profile of the second user, or other information about the second user. According to an implementation, information related to subsequent users of the group of users is output, wherein the first user makes a determination (e.g., selects) one of the riders from the group of users.

Instructions for pairing with the second user (or the selected user) are provided, at 712. According to an implementation, the instructions may be output about the same time as the first user chooses one of the other users or approves the recommended user. The instructions may include a map that is displayed on a heads-up display, a windshield, a helmet, a user device, glasses, or on another surface that is perceivable by the first user. The map may include a location of the first user, the second user, and other users within the group of users.

Figure 8:
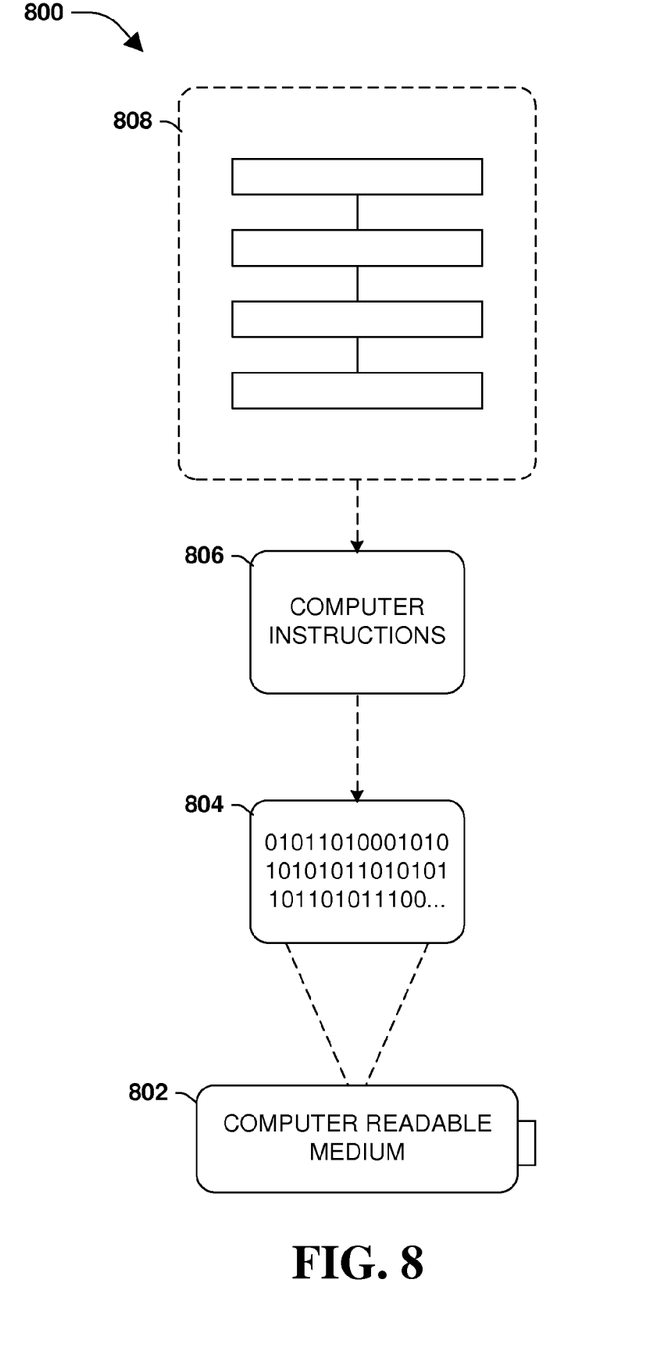
FIG. 8 illustrates an example, non-limiting, computer-readable medium or computer-readable device including processor-executable instructions configured to embody one or more of the aspects of this disclosure.

One or more implementations may include a computer-readable medium including processor-executable instructions configured to implement one or more embodiments presented herein. An embodiment of a computer-readable medium or a computer-readable device devised in these ways is illustrated in FIG. 8, wherein an implementation 800 includes a computer-readable medium 802, such as a CD-R, DVD-R, flash drive, a platter of a hard disk drive, and so forth, on which is encoded computer-readable data 804. The computer-readable data 804, such as binary data including a plurality of zero's and one's as illustrated, in turn includes a set of computer instructions 806 configured to operate according to one or more of the principles set forth herein.

In the illustrated embodiment 800, the processor-executable computer instructions 806 may be configured to perform a method 808, such as the method 600 of FIG. 6 and/or the method 700 of FIG. 7, for example. In another embodiment, the processor-executable instructions 804 may be configured to implement a system, such as the system 200 of FIG. 2 and/or the system 400 of FIG. 4, for example. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter may be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 9:
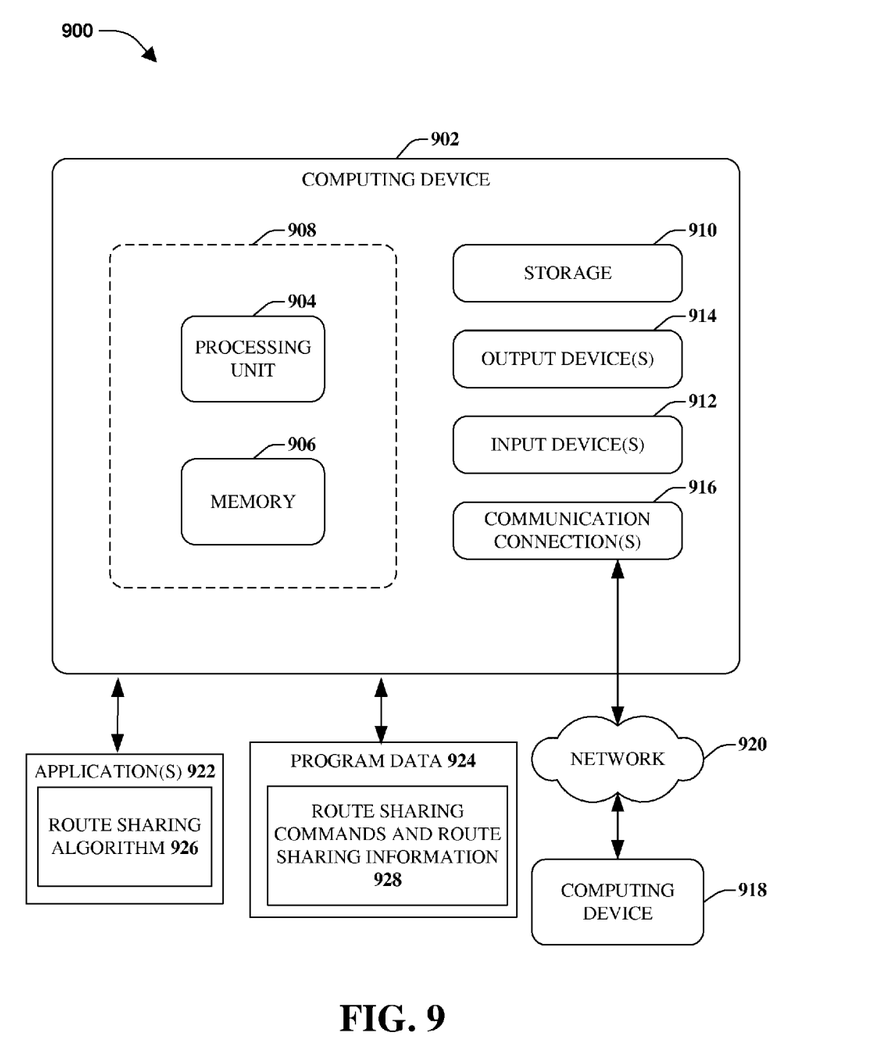
FIG. 9 illustrates an example, non-limiting computing environment where one or more of the aspects of this disclosure are implemented.

FIG. 9 and the following discussion provide a description of a suitable computing environment to implement embodiments of one or more of the aspects set forth herein. The operating environment of FIG. 9 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 9 illustrates a system 900 that may include a computing device 902 configured to implement one or more embodiments provided herein. In one configuration, the computing device 902 may include at least one processing unit 904 and at least one memory 906. Depending on the exact configuration and type of computing device, the at least one memory 906 may be volatile, such as RAM, non-volatile, such as ROM, flash memory, etc., or a combination thereof. This configuration is illustrated in FIG. 9 by dashed line 908.

In other embodiments, the device 902 may include additional features or functionality. For example, the device 902 may include additional storage such as removable storage or non-removable storage, including, but not limited to, magnetic storage, optical storage, etc. Such additional storage is illustrated in FIG. 9 by storage 910. In one or more embodiments, computer readable instructions to implement one or more embodiments provided herein are in the storage 910. The storage 910 may store other computer readable instructions to implement an operating system, an application program, etc. Computer readable instructions may be loaded in the at least one memory 906 for execution by the at least one processing unit 904, for example.

Computing devices may include a variety of media, which may include computer-readable storage media or communications media, which two terms are used herein differently from one another as indicated below.

Computer-readable storage media may be any available storage media, which may be accessed by the computer and includes both volatile and nonvolatile media, removable and non-removable media. By way of example, and not limitation, computer-readable storage media may be implemented in connection with any method or technology for storage of information such as computer-readable instructions, program modules, structured data, or unstructured data. Computer-readable storage media may include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which may be used to store desired information. Computer-readable storage media may be accessed by one or more local or remote computing devices (e.g., via access requests, queries or other data retrieval protocols) for a variety of operations with respect to the information stored by the medium.

Communications media typically embody computer-readable instructions, data structures, program modules, or other structured or unstructured data in a data signal such as a modulated data signal (e.g., a carrier wave or other transport mechanism) and includes any information delivery or transport media. The term "modulated data signal" (or signals) refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The device 902 may include input device(s) 912 such as keyboard, mouse, pen, voice input device, touch input device, infrared cameras, video input devices, or any other input device. Output device(s) 914 such as one or more displays, speakers, printers, or any other output device may be included with the device 902. The input device(s) 912 and the output device(s) 914 may be connected to the device 902 via a wired connection, wireless connection, or any combination thereof. In one or more embodiments, an input device or an output device from another computing device may be used as the input device(s) 912 and/or the output device(s) 914 for the device 902. Further, the device 902 may include communication connection(s) 916 to facilitate communications with one or more other devices, illustrated as a computing device 918 coupled over a network 920.

One or more applications 922 and/or program data 924 may be accessible by the computing device 902. According to some implementations, the application(s) 922 and/or program data 924 are included, at least in part, in the computing device 902. The application(s) 922 may include a route sharing algorithm 926 that is arranged to perform the functions as described herein including those described with respect to the example non-limiting system 400 of FIG. 4. The program data 924 may include route sharing commands and route sharing information 928 that may be useful for operation with allowing one or more riders to pair with one or more other riders in order to travel as a group as described herein.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or." Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first," "second," or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising," "comprises," "including," "includes," or the like generally means comprising or including.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. An organic gathering system for route sharing, comprising:
    a profile manager determining settings associated with a first vehicle based on user input data or observed data, for pairing with at least a second vehicle during travel, wherein the settings include at least one of driving habits, riding habits, route preferences, destination, skill level and vehicle style;
    an observation manager determining a group of vehicles in a defined geographic area based upon the determined settings associated with the first vehicle, for pairing with the first vehicle during at least a portion of the travel, the group of vehicles includes at least the second vehicle;
    a linking component pairing, via a scheme, the first vehicle with at least the second vehicle based on respective determined settings from the determined group of vehicles in the defined geographic area; and
    a navigation manager providing instructions to the first vehicle and the at least second vehicle related to the pairing via at least one of a short-range communications wireless network, a long-range wireless communications network, or a wireless mobile network, the instructions include an action to be performed by the first vehicle to pair with at least the second vehicle;
    wherein the instructions are displayed on graphical user interface (GUI) included in a heads-up display or mobile device.

2. The organic gathering system of claim 1, wherein the navigation manager instructs the first vehicle to wait at a particular location for at least the second vehicle.

3. The organic gathering system of claim 1, comprising a route determiner evaluating planned routes of the group of vehicles in view of a planned route of the first vehicle and selecting at least the second vehicle based on the planned routes.

4. The organic gathering system of claim 1, the navigation manager outputs the instructions in a combination with a visual format and an audio format or a haptic format.

5. The organic gathering system of claim 1, wherein the first vehicle and at least the second vehicle are motorcycles and the head-up display is located on a motorcycle helmet.

6. The organic gathering system of claim 1, wherein the first vehicle is a first drone and at least the second vehicle is a second drone.

7. The organic gathering system of claim 1, comprising a rate monitor providing to the first vehicle respective rankings for the vehicles in the group of vehicles, the respective rankings relate to a match between a recommended profile for the vehicle and respective profiles of the users in the group of vehicles.

8. The organic gathering system of claim 1, comprising a route comparator comparing a route of the first vehicle with respective routes of the vehicles in the group of vehicles.

9. The organic gathering system of claim 1, wherein the heads-up display is located on a windshield.

10. A method for pairing two or more users for travel together, comprising:
    determining, by a system comprising a processor, profile data associated with a first user based on user input data or observed data, wherein the profile data include at least one of driving habits, riding habits, route preferences, destination, skill level and vehicle style
    determining, by the system, a group of users traveling within a geographic area of the first user based upon profile data of the first user;
    evaluating, by the system, respective profile data of each user in the group of users determined to be traveling with the geographic area based on profile data of the first user;
    outputting, by the system, details related to a second user of the group of users as a result of the evaluating; and
    providing, by the system, instructions to the first user and the second user for pairing, based on a scheme, via at least one of a short-range communications wireless network, a long-range wireless communications network, or a wireless mobile network, the instructions comprise at least details to the first user related to waiting at a designated location until the second user arrives at the designated location;
    wherein the details are displayed on graphical user interface (GUI) included in a heads-up display or mobile device.

11. The method of claim 10, the evaluating comprises ranking each user in the group of users based on a comparison between the respective profile data and the profile data of the first user.

12. The method of claim 10, wherein the details further comprise map information with an indication of the location of the first user and respective locations of the users of the group of users.

13. The method of claim 10, wherein the heads-up display is located on a windshield.

14. An organic gathering system for pairing motorcycle riders, comprising:
    a profile manager determining preferences associated with a motorcycle rider based on user input data or observed data, for pairing the motorcycle rider with another motorcycle rider, wherein the preferences include at least one of driving habits, riding habits, route preferences, destination, skill level and vehicle style;
    an observation manager determining other motorcycle riders that are located within a defined area of the motorcycle rider based upon the determined preferences associated with the motorcycle rider;
    a rate monitor ranking the other motorcycle riders based on a comparison between the preferences associated with the motorcycle rider and respective preferences associated with the other motorcycle riders;
    an interface component receiving a selection of at least one motorcycle rider from the other motorcycle riders; and
    a navigation manager outputting instructions to the motorcycle rider and the other motorcycle rider via at least one of a short-range communications wireless network, a long-range wireless communications network, or a wireless mobile network, that allows the motorcycle rider to pair, via a scheme, with at least the one motorcycle rider based on at least the motorcycle rider stopping at a determined location for at least the one motorcycle rider;

wherein the instructions are displayed on graphical user interface (GUI) included in a heads-up display or mobile device.

15. The organic gathering system for pairing motorcycle riders of claim 14, wherein the navigation manager outputs the instructions on a heads-up display viewable by the motorcycle rider.

16. The organic gathering system for pairing motorcycle riders of claim 14, comprising a notification component that notifies at least the one motorcycle rider that the motorcycle rider would like to pair for at least a portion of a route.

* * * * *